United States Patent
Lin

(10) Patent No.: US 11,163,816 B2
(45) Date of Patent: *Nov. 2, 2021

(54) SYSTEM AND METHOD FOR SCROLLING THROUGH MEDIA FILES ON TOUCHSCREEN DEVICES

(71) Applicant: NBCUniversal Media, LLC, New York, NY (US)

(72) Inventor: Ping-Hsien Lin, Milpitas, CA (US)

(73) Assignee: NBCUniversal Media, LLC, New York, NY (US)

( * ) Notice: Subject to any disclaimer, the term of this patent is extended or adjusted under 35 U.S.C. 154(b) by 129 days.

This patent is subject to a terminal disclaimer.

(21) Appl. No.: 16/005,402

(22) Filed: Jun. 11, 2018

(65) Prior Publication Data

US 2018/0293244 A1    Oct. 11, 2018

Related U.S. Application Data

(62) Division of application No. 14/747,942, filed on Jun. 23, 2015, now Pat. No. 9,996,243.

(51) Int. Cl.
| | |
|---|---|
| *G06F 16/44* | (2019.01) |
| *H04N 21/472* | (2011.01) |
| *G06F 3/0488* | (2013.01) |
| *G06F 3/0485* | (2013.01) |
| *H04N 21/432* | (2011.01) |

(Continued)

(52) U.S. Cl.
CPC ............ *G06F 16/44* (2019.01); *G06F 3/0485* (2013.01); *G06F 3/0488* (2013.01); *G11B 27/102* (2013.01); *G11B 27/34* (2013.01); *H04N 21/4325* (2013.01); *H04N 21/47217* (2013.01)

(58) Field of Classification Search
CPC .. G06F 3/0488; G06F 16/44; H04N 21/47217
See application file for complete search history.

(56) References Cited

U.S. PATENT DOCUMENTS

| | | | |
|---|---|---|---|
| 2002/0059602 A1* | 5/2002 | Macrae | H04N 21/4316 725/42 |
| 2008/0066102 A1 | 3/2008 | Abraham et al. | |

(Continued)

*Primary Examiner* — Cao H Nguyen
(74) *Attorney, Agent, or Firm* — Fletcher Yoder, PC

(57) ABSTRACT

Some embodiments include a system. The system can comprise: one or more processors; and one or more non-transitory computer-readable media storing computing instructions configured to run on the one or more processors and perform acts of: transmitting instructions to initiate a playback of a media file on an electronic device; receiving, from a user, an instruction to enter a navigation mode; in response to receiving the instruction to enter the navigation mode, transmitting instructions to display a set of multiple thumbnails on a display, wherein each thumbnail of the set of multiple thumbnails represents a different portion of the media file; receiving, from the user, an input indicating a request to view a first portion of the media file represented by a first thumbnail of the set of multiple thumbnails on the display; and transmitting instructions to resume the playback of the media file on the electronic device at the first portion of the media file represented by the first thumbnail of the set of multiple thumbnails on the display. Other embodiments are disclosed herein.

20 Claims, 9 Drawing Sheets

(51) Int. Cl.
*G11B 27/10* (2006.01)
*G11B 27/34* (2006.01)

(56) References Cited

U.S. PATENT DOCUMENTS

| | | | |
|---|---|---|---|
| 2011/0320626 A1* | 12/2011 | Wong | H04N 21/41407 |
| | | | 709/231 |
| 2012/0144424 A1* | 6/2012 | Ganesan | H04N 21/42204 |
| | | | 725/40 |
| 2012/0236201 A1* | 9/2012 | Larsen | H04N 21/439 |
| | | | 348/468 |
| 2014/0229834 A1* | 8/2014 | Jain | G06F 3/0488 |
| | | | 715/720 |
| 2015/0106856 A1* | 4/2015 | Rankine | H04N 21/4725 |
| | | | 725/60 |

\* cited by examiner

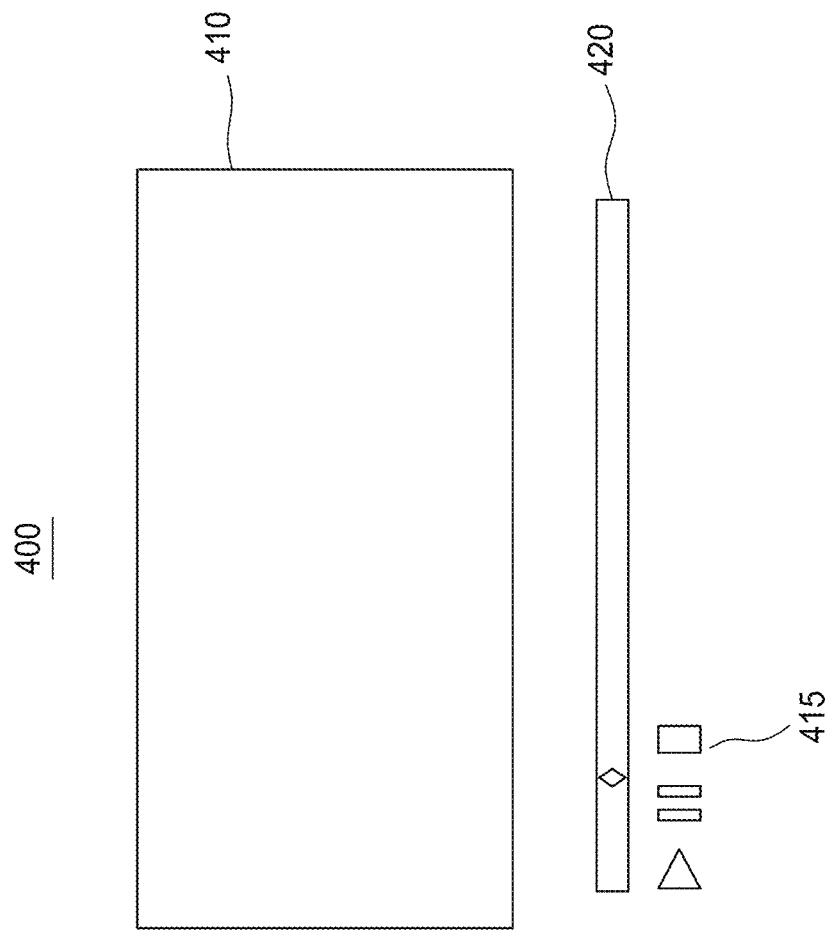

SYSTEM AND METHOD FOR SCROLLING THROUGH MEDIA FILES ON TOUCHSCREEN DEVICES

CROSS REFERENCE TO RELATED APPLICATIONS

The present application is a continuation-in-part application claiming priority to application Ser. No. 14/747,942, titled "System and Method for Scrolling Through Media Files on Touchscreen Devices," filed on Jun. 23, 2015, the disclosure of which is hereby incorporated by this reference in its entirety.

TECHNICAL FIELD

This disclosure relates generally to media playback, and relates more particularly to video playback on touchscreen devices.

BACKGROUND

More and more consumers are consuming media, including video content (e.g., movies and TV shows) using mobile devices or other devices that feature a touchscreen interface. Often times, consumers wish to advance through media content. Current methods of advancing through media content might not allow fine enough control of the media content.

BRIEF DESCRIPTION OF THE DRAWINGS

To facilitate further description of the embodiments, the following drawings are provided in which:

FIGS. 4A-4B are screenshots illustrating a screen layout of the prior art;

Figure 1:
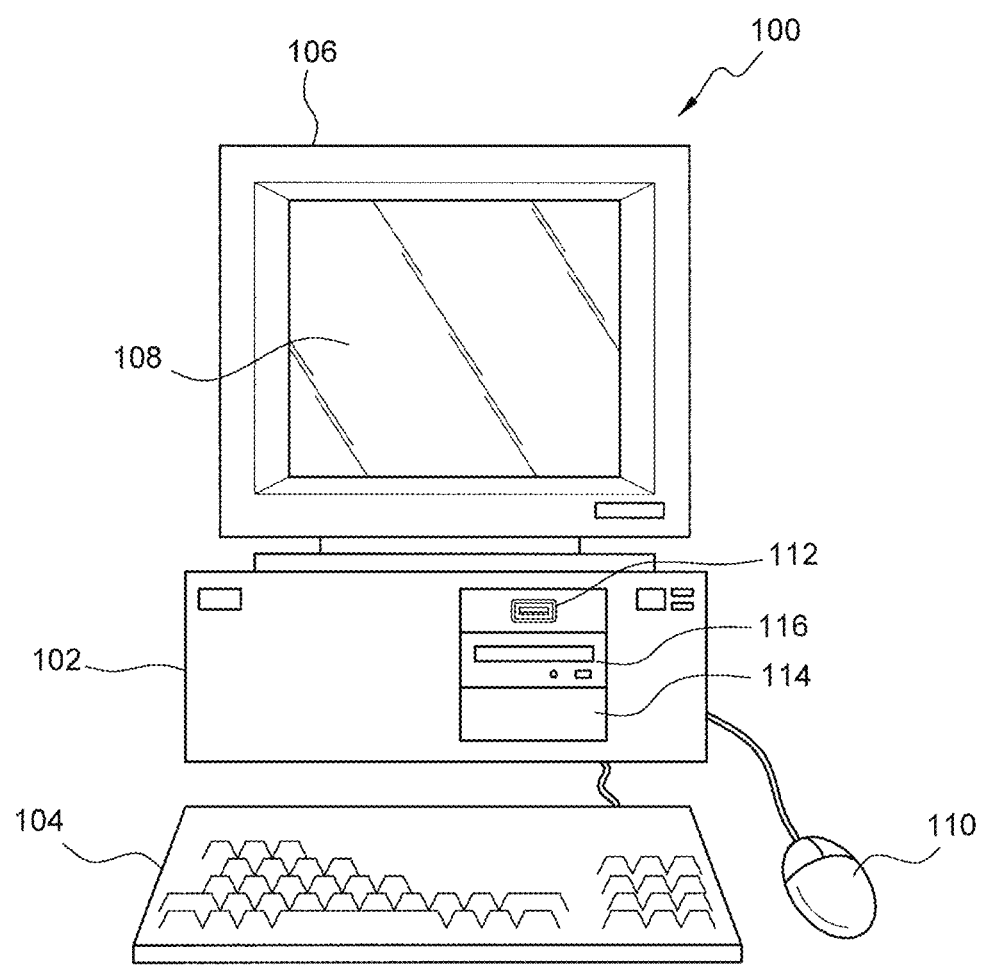
FIG. 1 illustrates a front elevation view of a computer system that is suitable for implementing at least part of a central computer system, according to an embodiment.

For simplicity and clarity of illustration, the drawing figures illustrate the general manner of construction, and descriptions and details of well-known features and techniques might be omitted to avoid unnecessarily obscuring the present disclosure. Additionally, elements in the drawing figures are not necessarily drawn to scale. For example, the dimensions of some of the elements in the figures might be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but might include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements can be electrically coupled together, but not be mechanically or otherwise coupled together. Coupling can be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Some embodiments include a system. The system can comprise: one or more processors; and one or more non-transitory computer-readable media storing computing instructions configured to run on the one or more processors and perform acts of: transmitting instructions to initiate a playback of a media file on an electronic device; receiving, from a user, an instruction to enter a navigation mode; in response to receiving the instruction to enter the navigation mode, transmitting instructions to display a set of multiple thumbnails on a display, wherein each thumbnail of the set of multiple thumbnails represents a different portion of the media file; receiving, from the user, an input indicating a request to view a first portion of the media file represented by a first thumbnail of the set of multiple thumbnails on the display; and transmitting instructions to resume the playback of the media file on the electronic device at the first portion of the media file represented by the first thumbnail of the set of multiple thumbnails on the display.

Some embodiments include a method implemented via execution of computing instructions configured to run at one or more processors and configured to be stored at non-transitory computer-readable media, the method can comprise: transmitting instructions to initiate a playback of a media file on an electronic device; receiving, from a user, an instruction to enter a navigation mode; in response to receiving the instruction to enter the navigation mode, transmitting instructions to display a set of multiple thumbnails on a display, wherein each thumbnail of the set of multiple thumbnails represents a different portion of the media file; receiving, from the user, an input indicating a request to view a first portion of the media file represented by a first thumbnail of the set of multiple thumbnails on the display; and transmitting instructions to resume the playback of the media file on the electronic device at the first portion of the media file represented by the first thumbnail of the set of multiple thumbnails on the display.

Some embodiments include a system. The system can comprise: a touch sensitive display device; one or more processing modules; and one or more non-transitory storage modules storing computing instructions configured to run on the one or more processing modules and perform the acts of: initiating playback of a media file on a touchscreen display; receiving an instruction to enter a navigation mode; displaying a set of one or more thumbnails on the display wherein each of the set of one or more thumbnails represents a portion of the media file; receiving an input from a user indicating a desire to view a portion of the media file represented by one of the set of one or more thumbnails on the display; and resuming playback of the media file on the display at the portion of the media file represented by one of the set of one or more thumbnails on the display; wherein the input from the user indicating a desire to view a portion of the media file comprises using scroll gestures on the set of one or more thumbnails to display a desired portion of the media file.

Some embodiments include a method. The method can comprise: initiating playback of a media file on a display; receiving an instruction to enter a navigation mode; displaying a set of one or more thumbnails on the display wherein each of the set of one or more thumbnails represents a portion of the media file; receiving an input from a user indicating a desire to view a portion of the media file represented by one of the set of one or more thumbnails on the display; and resuming playback of the media file on the display at the portion of the media file represented by one of the set of one or more thumbnails on the display; wherein the input from the user indicating the desire to view the portion of the media file comprises using scroll gestures on the set of one or more thumbnails to display a desired portion of the media file; and the input from the user is received from a touch-sensitive device.

Some embodiments include a method. The method can comprise: initiating playback of a media file on a display; receiving an instruction to enter a navigation mode; displaying a set of one or more thumbnails on the display wherein each of the set of one or more thumbnails represents a portion of the media file; receiving an input from a user indicating a desire to view a portion of the media file represented by one of the set of one or more thumbnails on the display; and resuming playback of the media file on the display at the portion of the media file represented by one of the set of one or more thumbnails on the display; wherein the input from the user indicating a desire to view a portion of the media file comprises using scroll gestures on the set of one or more thumbnails to display a desired portion of the media file; and further wherein the input from the user is received from a touch-sensitive device.

Figure 2:
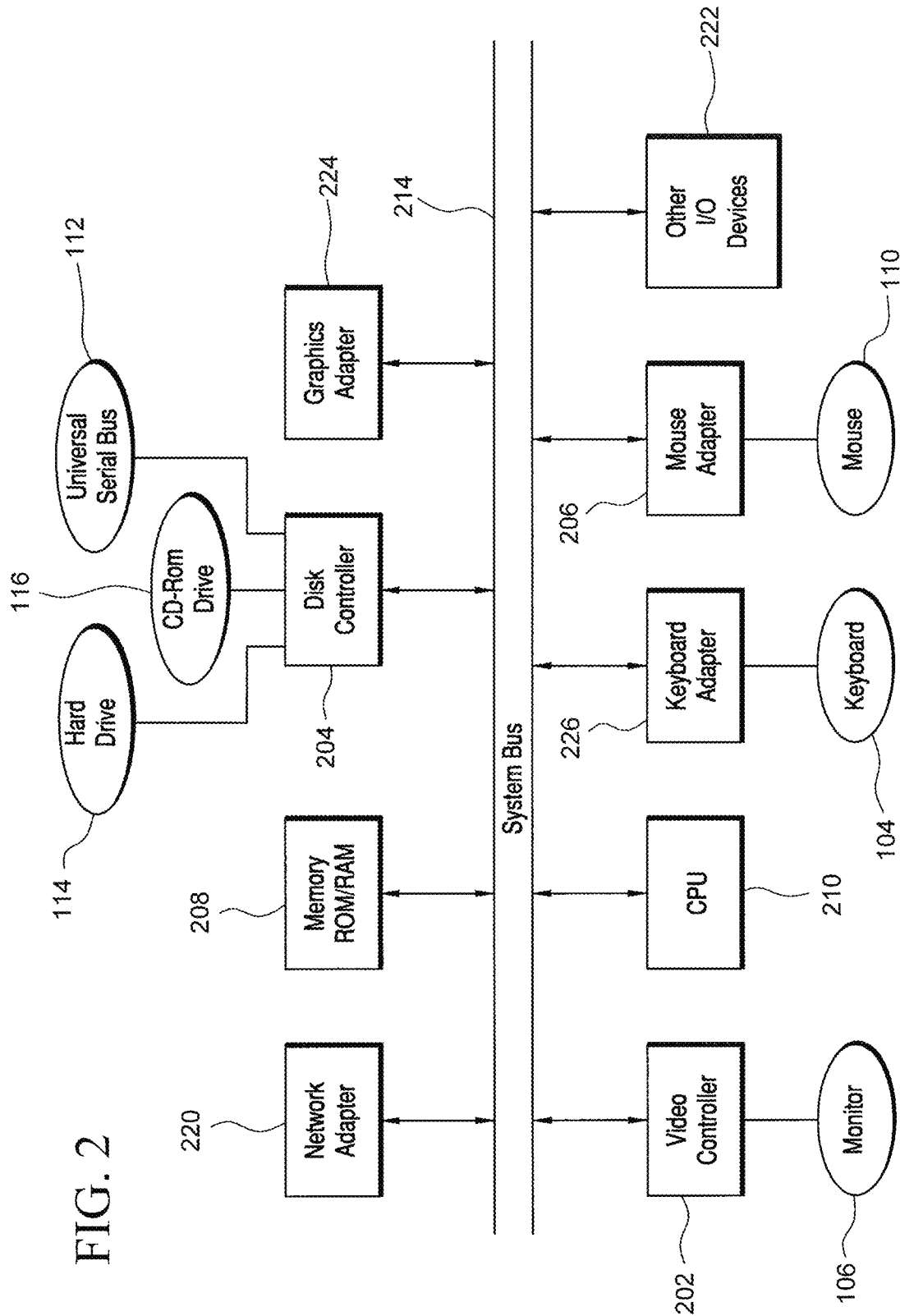
FIG. 2 illustrates a representative block diagram of exemplary elements included on the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a drive 114. Drive 114 can be a hard drive that uses spinning magnetic disks to store data or it can be a solid state drive (SSD) that uses a fast, non-volatile memory for storage. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), drive 114 (FIGS. 1-2), CD-ROM and/or DVD drive 116 (FIGS. 1-2), a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
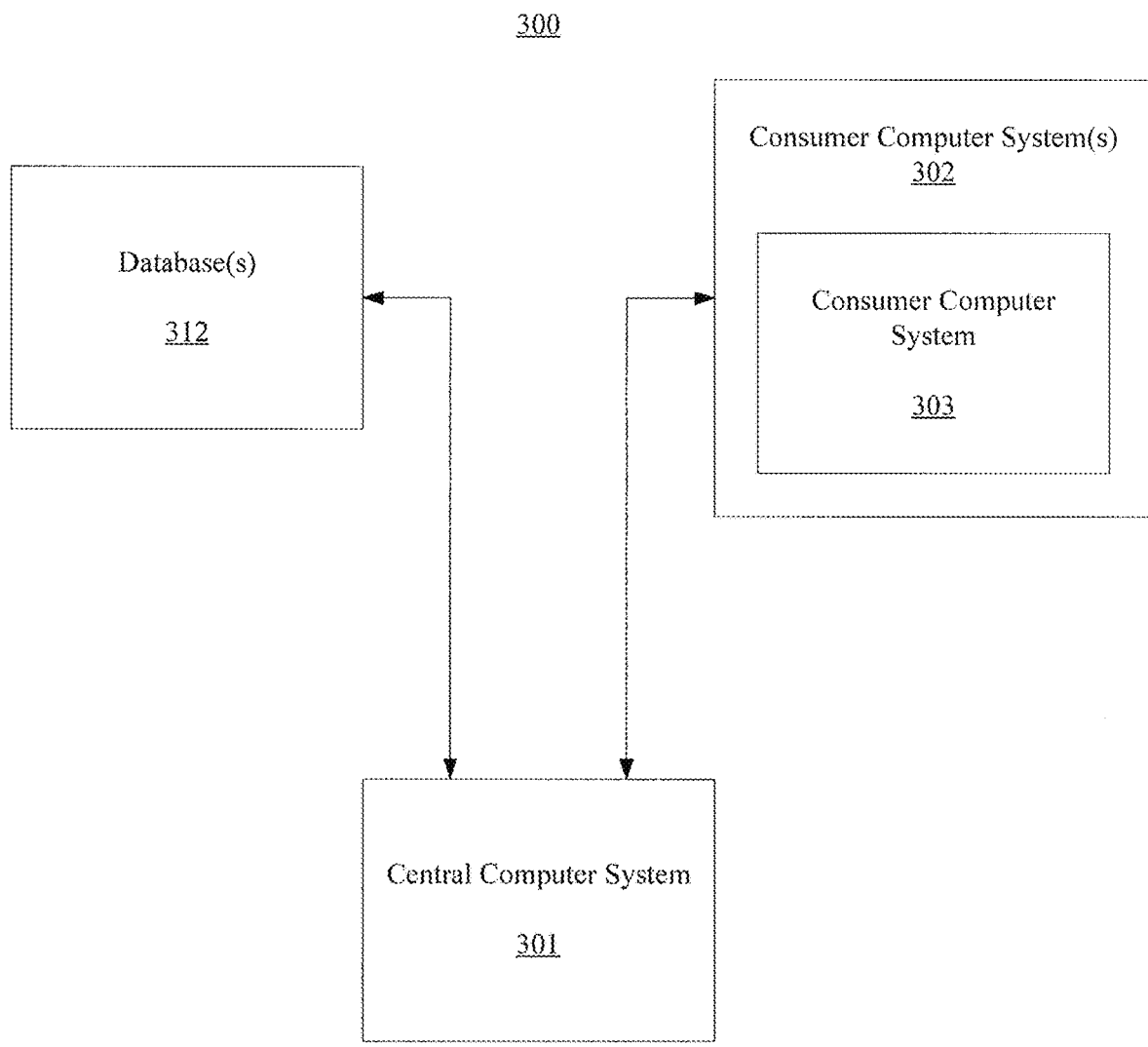
FIG. 3 illustrates a representative block diagram of a system, according to an embodiment.

Skipping ahead now in the drawings, FIG. 3 illustrates a representative block diagram of a system 300, according to an embodiment. System 300 is merely exemplary and embodiments of the system are not limited to the embodiments presented herein. System 300 can be employed in many different embodiments or examples not specifically depicted or described herein. In some embodiments, certain elements or modules of system 300 can perform various methods and/or activities of those methods. In these or other embodiments, the methods and/or the activities of the methods can be performed by other suitable elements or modules of system 300.

As further described in greater detail below, in these or other embodiments, system 300 can proactively (e.g., prospectively) and/or reactively (e.g., responsively) determine and/or communicate the consumer product information to the consumer, as desired. Proactive acts can refer to acts (e.g., identification, determination, communication, etc.) performed without consideration of one or more predetermined acts performed by the consumer; and reactive acts can refer to acts (e.g., identification, determination, communication, etc.) performed with consideration of (i.e., in response to) one or more predetermined acts performed by the consumer. For example, in some embodiments, the predetermined act(s) can comprise an act of identifying a selection of a consumer product by the consumer.

Meanwhile, as also described in greater detail below, system 300 can be implemented in brick-and-mortar commerce and/or electronic commerce applications, as desirable. Further, in many of these or other embodiments, system 300 can communicate the consumer product information to the consumer substantially in real-time (e.g., near real-time). Near real-time can mean real-time less a time delay for processing (e.g., determining) and/or transmitting the relevant consumer product information to the relevant consumer. The particular time delay can vary depending on the type and/or amount of the consumer product information, the processing speed(s) of the processing module(s) of system 300, the transmission capability of the communication hardware (as introduced below), the transmission distance, etc. However, in many embodiments, the time delay can be less than approximately one, five, ten, or twenty minutes.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Specifically, system 300 comprises a central computer system 301. In many embodiments, central computer system 301 can be similar or identical to computer system 100 (FIG. 1). Accordingly, central computer system 301 can comprise one or more processing modules and one or more memory storage modules (e.g., one or more non-transitory memory storage modules). In these or other embodiments, the processing module(s) and/or the memory storage module(s) can be similar or identical to the processing module(s) and/or memory storage module(s) (e.g., non-transitory memory storage modules) described above with respect to computer system 100 (FIG. 1). In some embodiments, central computer system 301 can comprise a single computer or server, but in many embodiments, central computer system 301 comprises a cluster or collection of computers or servers and/or a cloud of computers or servers. Meanwhile, central computer system 301 can comprise one or more input devices (e.g., one or more keyboards, one or more keypads, one or more pointing devices such as a computer mouse or computer mice, one or more touchscreen displays, etc.), and/or can comprise one or more display devices (e.g., one or more monitors, one or more touchscreen displays, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of central computer system 301 in a wired manner and/or a wireless manner, and the coupling can be direct and/or indirect, as well as locally and/or remotely. As an example of an indirect manner (which may or may not be a remote manner, as well), a keyboard-video-mouse (KVM) switch can be used to couple the input device(s) and the display device(s) to the processing module(s) and/or the memory storage module(s). In some embodiments, the KVM switch also can be part of central computer system 301. In a similar manner, the processing module(s) and the memory storage module(s) can be local and/or remote to each other.

In many embodiments, central computer system 301 is configured to communicate with one or more consumer computer systems 302 (e.g., a consumer computer system 303) of one or more consumers. For example, the consumer(s) can interface (e.g., interact) with central computer system 301, and vice versa, via consumer computer system(s) 302 (e.g., consumer computer system 303). Accordingly, in many embodiments, central computer system 301 can refer to a back end of system 300 operated by an operator and/or administrator of system 300, and consumer computer system(s) 302 can refer to a front end of system 300 used by one or more users of system 300 (i.e., the consumer(s)). In these or other embodiments, the operator and/or administrator of system 300 can manage central computer system 301, the processing module(s) of computer system 301, and/or the memory storage module(s) of computer system 301 using the input device(s) and/or display device(s) of central computer system 301. In some embodiments, system 300 can comprise consumer computer system(s) 302 (e.g., consumer computer system 303).

Like central computer system 301, each of consumer computer system(s) 302 can be similar or identical to computer system 100 (FIG. 1), and in many embodiments, each of consumer computer system(s) 302 can be similar or identical to each other. In many embodiments, consumer computer system(s) 302 can comprise one or more desktop computer devices, one or more wearable user computer devices, and/or one or more mobile devices, etc. At least part of central computer system 301 can be located remotely from consumer computer system(s) 302.

In some embodiments, a mobile device can refer to a portable electronic device (e.g., an electronic device easily conveyable by hand by a person of average size) with the capability to present audio and/or visual data (e.g., images, videos, music, etc.). For example, a mobile device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can comprise a volume and/or weight sufficiently small as to permit the mobile device to be easily conveyable by hand. For examples, in some embodiments, a mobile device can occupy a volume of less than or equal to approximately 189 cubic centimeters, 244 cubic centimeters, 1790 cubic centimeters, 2434 cubic centimeters, 2876 cubic centimeters, 4056 cubic centimeters, and/or 5752 cubic centimeters. Further, in these embodiments, a mobile device can weigh less than or equal to 3.24 Newtons, 4.35 Newtons, 15.6 Newtons, 17.8 Newtons, 22.3 Newtons, 31.2 Newtons, and/or 44.5 Newtons.

Exemplary mobile devices can comprise, but are not limited to, one of the following: (i) an iPod®, iPhone®, iPod Touch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia®, Surface Pro™, or similar product by the Microsoft Corporation of Redmond, Wash., United States of America, and/or (iv) a Galaxy™, Galaxy Tab™, Note™, or similar product by the Samsung Group of Samsung Town, Seoul, South Korea. Further, in the same or different embodiments, a mobile device can comprise an electronic device configured to implement one or more of (i) the iOS™ operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by Google, Inc. of Mountain View, Calif., United States, (v) the Windows Mobile™, Windows Phone™, and Windows 10 (mobile)™ operating systems by Microsoft Corporation of Redmond, Wash., United States of America, or (vi) the Symbian™ operating system by Nokia Corp. of Keilaniemi, Espoo, Finland.

In further embodiments, central computer system 301 can be configured to communicate with software (e.g., one or more web browsers, one or more mobile software applications, etc.) of the consumer computer system(s) 302 (e.g., consumer computer system 303). For example, the software can run on one or more processing modules and can be stored on one or more memory storage modules (e.g., one or more non-transitory memory storage modules) of the consumer computer system(s) 302 (e.g., consumer computer system 303). In these or other embodiments, the processing module(s) of the consumer computer system(s) 302 (e.g., consumer computer system 303) can be similar or identical to the processing module(s) described above with respect to computer system 100 (FIG. 1). Further, the memory storage module(s) (e.g., non-transitory memory storage modules) of the consumer computer system(s) 302 (e.g., consumer computer system 303) can be similar or identical to the memory storage module(s) (e.g., non-transitory memory storage module(s)) described above with respect to computer system 100 (FIG. 1). Exemplary web browsers can include (i) Firefox® by the Mozilla Organization of Mountain View, Calif., United States of America, (ii) Internet Explorer® by the Microsoft Corp. of Redmond, Wash., United States of America, (iii) Chrome™ by Google Inc. of Menlo Park, Calif., United States of America, (iv) Opera® by Opera Software of Oslo, Norway, and (v) Safari® by Apple Inc. of Cupertino, Calif., United States of America.

Meanwhile, in many embodiments, central computer system 301 also can be configured to communicate with one or more databases 312. The database can comprise a product database that contains information about products sold by a retailer. Database(s) 312 can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of database(s) 312, that particular database can be stored on a single memory storage module of the memory storage module(s) and/or the non-transitory memory storage module(s) storing database(s) 312 or it can be spread across multiple of the memory storage module(s) and/or non-transitory memory storage module(s) storing database(s) 312, depending on the size of the particular database and/or the storage capacity of the memory storage module(s) and/or non-transitory memory storage module(s).

In these or other embodiments, the memory storage module(s) of central computer system 300 can comprise some or all of the memory storage module(s) storing database(s) 312. In further embodiments, some of the memory storage module(s) storing database(s) 312 can be part of consumer computer systems 302 and/or one or more third-party computer systems (i.e., other than central computer system 301 and consumer computer systems 302), and in still further embodiments, all of the memory storage module(s) storing database(s) 312 can be part of consumer computer systems 302 and/or the third-party computer system(s). Like central computer system 301 and consumer computer system(s) 302, when applicable, each of the third-party computer system(s) can be similar or identical to computer system 100 (FIG. 1). Notably, the third-party computer systems are omitted from the drawings to better illustrate that database(s) 312 can be stored at memory storage module(s) of central computer system 301, consumer computer system(s) 302, and/or the third-party computer systems, depending on the manner in which system 300 is implemented.

Database(s) 312 each can comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between central computer system 301, consumer computer system(s) 302 (e.g., consumer computer system 303), and/or database(s) 312 can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc. Exemplary LAN and/or WAN protocol(s) can comprise Data Over Cable Service Interface Specification (DOCSIS), Institute of Electrical and Electronic Engineers (IEEE) 802.3 (also known as Ethernet), IEEE 802.11 (also known as WiFi), etc. Exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, and the like. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.)

In some embodiments, communications and/or data transmitted and/or received by, within and/or between the system 300 can be performed automatically. In further embodiments, communications and/or data transmitted and/or received by, within and/or between the system 300 can be performed in real time. In other embodiments, from communications and/or data transmitted and/or received by, within and/or between the system 300 can originate from multiple sources.

For convenience, the functionality of system 300 is described herein as it relates particularly to consumer computer system 303 and a single consumer, but in many embodiments, the functionality of system 300 can be extended to each of consumer computer system(s) 302 and/or to multiple consumers. In these extended examples, in some embodiments, single consumers can interface (e.g., interact) with central computer system 301 using multiple consumer computer systems of consumer computer system(s) 302 (e.g., at different times). For example, a consumer could interface with central computer system 301 via a first consumer computer system (e.g., a desktop computer), such as, for example, when interfacing with central computer system 301 from home, and via a second consumer computer system (e.g., a mobile device), such as, for example, when interfacing with central computer system 301 away from home.

Recent advancements in computer technology have made the consumption of media, including audio and video, on mobile devices more and more common. Previously, one had to use optical media such as DVD and Blu-ray discs in order to view media files. However, improved download speeds and the proliferation of mobile devices has made the consumption of media on mobile devices (that cannot read optical media) increasingly more common.

One thing that many mobile devices have in common is the use of a touchscreen interface, also known as a touch-sensitive display. On such a touchscreen interface, instead of a user using a remote control, keyboard, mouse, or other type of interface, the user directly touches the screen upon which the media file is being displayed. The touchscreen has a variety of mechanisms by which it can detect a touch, either by a stylus or a finger. Exemplary touchscreen technologies include resistive touchscreens, capacitive touchscreens, optical imaging, and the like, though embodiments are not limited to any specific touchscreen technology. Some embodiments also can use other touch-sensitive devices, such as a touchpad.

Often, when a user is viewing a media file, the user might want to advance through the media file or go backwards through the media file. There can be many reasons to do so. For example, the user might want to view a particular scene again, or the user might want to skip one part of a media file that he has already viewed or is otherwise not interested in to access a later or earlier part of the media file.

Optical disc based media often make use of buttons to advance through a media file. An optical disc-based player is typically controlled via buttons on the front of the player or a remote control that has a variety of buttons. A typical remote control had various sets of buttons, including chapter back and skip; fast forward; and fast reverse. However, such controls might not be appropriate for media files viewed using a mobile device. For example, going backward and forward using those types of keys were relatively slow and/or might not be precise enough for some users. In addition, while disc-based media often uses chapter markers, streaming media and other media accessible using mobile devices might not use chapter markers, making chapter forward and chapter skip controls inoperable.

Computer-based media often uses other methods of allowing users to quickly find a portion of a media file. On-line services such as Youtube and Vimeo as well as media players such as VLC, Windows Media Player, Quicktime, and the like often use an interface that contains a slider.

With reference to FIG. 4A, a screen shot 400 containing an exemplary interface of the prior art is illustrated. As an example, screen shot 400 can be shown on a screen of monitor 106 (FIG. 1).

Window 410 is used to display the media content. Also present in screen shot 400 are transport controls 415 and slider 420. Transport controls 415 allow a user to start, stop, and pause a media file. Other transport controls (such as fast forward and fast reverse) also might be present. Other controls also can be present, but are not illustrated in FIG. 4A, such as window sizing controls, volume controls, and the like. There also can be status displays, such as elapsed time, time remaining, and the like.

Slider 420 serves two main purposes. First, slider 420 provides a visual indication of where in the media file the user is at. In a 10-minute media file, when the user is at the 5-minute mark of the media file, an indicator 422 on slider 420 will be at approximately the half-way point of slider 420. Indicator 422 can take a variety of different forms. For example, indicator 422 can be a shape (such as a diamond, square, circle) or indicator 422 can be a bar graph. Indicator 422 can take other forms as well. Slider 420 also allows a user to advance a media file to a specific point of a media file. For example, a user might want to advance to a point that is approximately 6 minutes into a 10-minute media file. The user would move indicator 422 within slider 420 until 6 minutes is displayed in the status area.

One disadvantage of the use of such a slider is that the user might not know where exactly he wants to advance the media file. It is rare that a user knows, for example, that a particular scene starts at exactly 6 minutes and 17 seconds into a media file. The user might simply want to advance past the opening credits of a movie, for example, and not know when the credits end. Or the user might want to view a scene or listen to a song again and might not know exactly when the scene started.

Figure 4B:
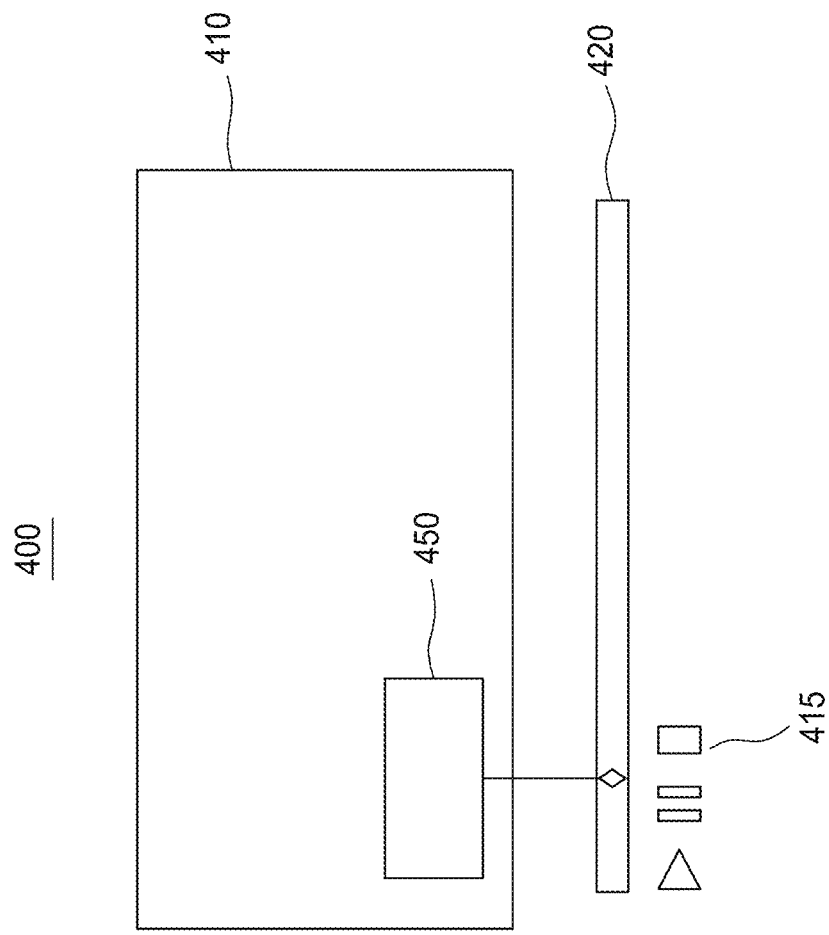

To alleviate such a problem, some media players have shown thumbnails on the screen. For example, when a user clicks on indicator 422 within slider 420, some media players show a thumbnail above indicator 422. Such an embodiment is shown in FIG. 4B. Window 410, transport controls 415, slider 420, and indicator 422 in FIG. 4B are similar to that shown in FIG. 4A. When a user touched or clicked on indicator 422 or slider 420, a thumbnail 450 might be displayed above indicator 422 or slider 420. Thumbnail 450 displays the content of the media file at the specific time indicated by the position of slider 420. The presence of thumbnail 450 can allow a user to more reliably find a particular scene that the user wants to view. For example, a user might want to watch a scene of a movie featuring two specific actors doing a particular scene. The user would then move indicator 422 within slider 420 until thumbnail 450 showed the scene the user is interested in viewing.

There are several limitations of such a methodology. For example, the rate of change of moving through a media file might not be precise. In many players, the size of slider 420 is a fixed length on screen, relative to the size of window 410, no matter the length of the media file. Navigating through a 5 minute media file using slider 420 might be relatively easy because a user can easily move slider 420 to an exact second. But navigating through a 3-hour movie is more difficult because slider 420 has a lower resolution—a small movement of the slider can result in a large movement through a media file.

A solution to the above and other problems is presented below. When using a device with a touchscreen interface, such as a mobile device, including a tablet, a smartphone, a laptop computer, and the like, a user is able to use gestures to bring up specific facets of an interface. One of the gestures can pause the media file and bring up a large series of thumbnails, each showing the media file at a specific instance in time. From this screen, swiping to the left and to the right can move through the media file. Also on this screen can be an indication of how far ahead each thumbnail is. Other gestures can change the amount of movement per gesture.

Figure 5:
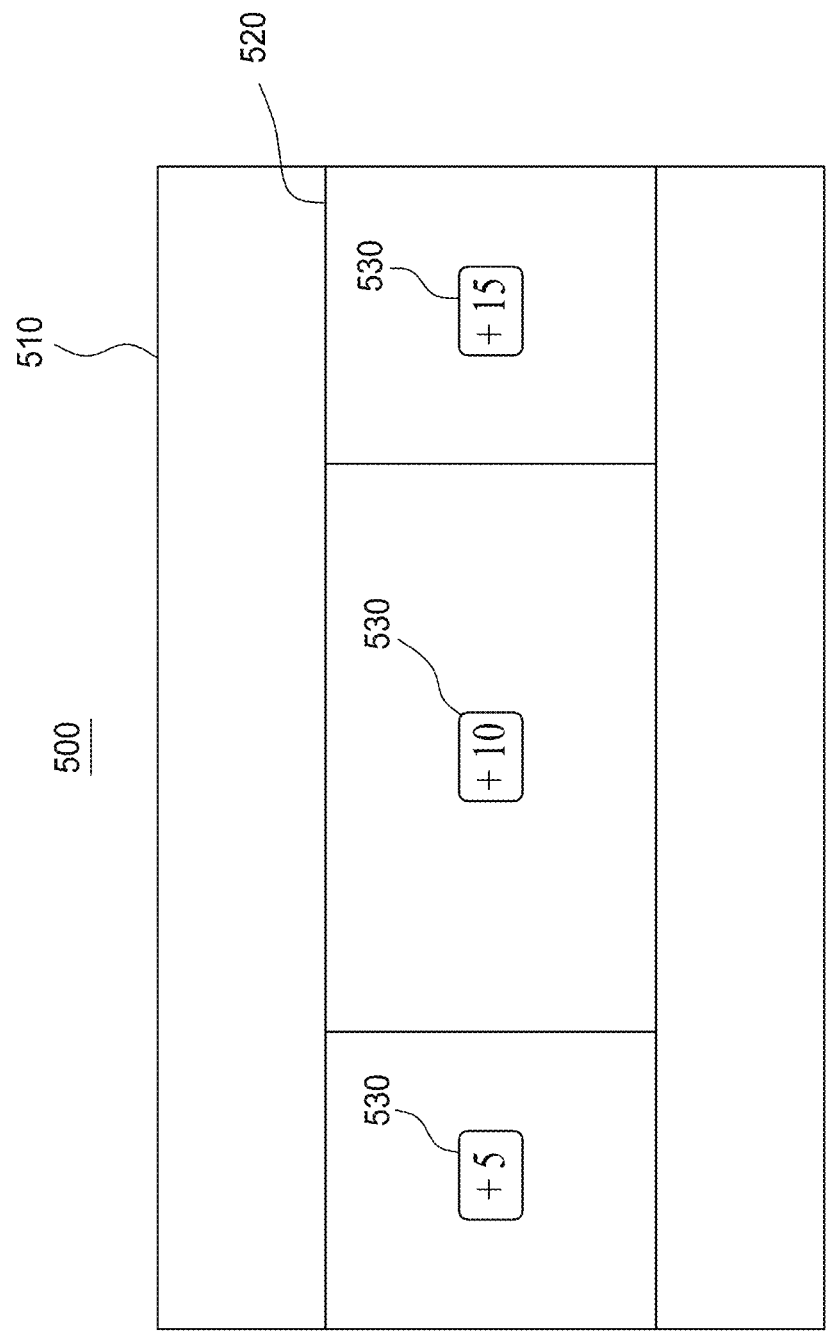
FIG. 5 is a screenshot illustrating a screen layout according to an embodiment.

With reference to FIG. 5, a screenshot 500 containing an exemplary interface is illustrated. FIG. 5 is merely exemplary and embodiments of the screen representation and menu system are not limited to the embodiments presented herein. The screen representation and menu system can be employed in many different embodiments or examples not specifically depicted or described herein. As an example, screen shot 500 can be shown on a screen 108 (FIG. 1) of monitor 106 (FIG. 1).

Window 510 is used to display media content. The media content is displayed in any manner now known in the art or developed in the future. For example, the media content is often compressed into a media file using a known technique (such as advanced audio coding (AAC), H.264, Moving Picture Experts Group (MPEG), MPEG-2 layer 3 (MP3), MPEG-2, MPEG-4, and the like). An application in the mobile device reads the media file from a long-term memory, such as drive 114 of FIG. 1, into temporary memory, such as memory storage 208 of FIG. 2. Thereafter, the media file can be decompressed by a processor, such as CPU 210 of FIG. 2, and the resulting content displayed on a display, such as display 108. It should be understood that a mobile device can take a tablet form and such components can be contained in a single device, such as a tablet or a smartphone.

After the user activates the transport mode, the playback of the media file is paused and a series of thumbnails 520 are shown. The transport mode can be activated in one of a variety of different manners. In some embodiments, the transport mode can be activated by tapping the screen. In some embodiments, the transport mode can be activated by touching the screen in a specific place of the display. In some embodiments, the transport mode can be activated using a specific multi-touch command, where the user uses multiple fingers to activate a transport mode. In such embodiments, the use of a transport mode lessens the need for transport controls 415 of FIG. 4A. Illustrated in FIG. 5 is a set of three thumbnails. It should be understood that a different number of thumbnails can also be shown by changing the size of the thumbnail. In some embodiments, the size of the thumbnails 520 can be adjusted by a user (either dynamically or through the use of a setting menu.) In an embodiment using dynamic sizing, a user can enter a sizing mode to resize thumbnails 520 using a variety of techniques, such as "pinching" by moving two fingers towards each other to make thumbnails 520 smaller or "zooming" by moving two fingers away from each other to make thumbnails 520 larger.

Thumbnails 520 can have a fixed aspect ratio (the ratio of the width of the frame to the height of the frame) that is the same for all media files (for example 16:9 is a commonly used aspect ratio in some mobile devices). In some embodiments, the aspect ratio of thumbnails 520 can vary depending on the aspect ratio of the media file (e.g., some videos might be 4:3, others might be 2.39:1 or some other aspect ratio).

Also shown in FIG. 5 are time indicators 530. After the user enters the transport mode, time indicators 530 are used to show the user how far in advance (or reverse) the particular thumbnail is. Each thumbnail in the set of thumbnails is at a time difference T from the next thumbnail in the set of thumbnails. In the embodiment shown in FIG. 5, T is 5 seconds, such that each thumbnail is 5 seconds ahead in time from the previous thumbnail, so the frames shown are +5 seconds, +10 seconds, and +15 seconds ahead of the paused frame. Other time values also can be used. In some embodiments, thumbnails can be 1 second apart. In some embodiments, the time difference T between thumbnails can be changed by the user. For example, a user can change the time difference through the use of gestures. A user might swipe up from a lower portion of the screen to an upper portion of the screen to make the time difference T between thumbnails greater or swipe down from an upper portion of the screen to a lower portion of the screen to make the time difference T between thumbnails smaller. In such a manner, the user can skip ahead 30 seconds at a time, a minute at a time, two minutes at a time, or even more.

When the thumbnails are displayed, the user is able to swipe to the left or to the right. For example, as shown in FIG. 5, the thumbnails are at 5 seconds, 10 seconds, and 15 seconds after the current screen. By making a right to left swiping motion on the screen, the thumbnails being shown can be at 20 seconds, 25 seconds, and 30 seconds after the current screen. Similarly, by making a left to right swiping motion on the screen, the thumbnails being shown can be at 15 seconds, 10 seconds, and 5 seconds before the current screen. A user can skip many frames by making the motion to the left or to the right fast, resulting in a large skip forward and back. Thereafter, the user can resume playback by exiting the transport mode. In some embodiments, a user can exit the transport mode by tapping on the screen. In some embodiments, the user taps on the screen on a particular thumbnail to exit transport mode at the particular time illustrated by the thumbnail. For example, if the user taps on the +15 second thumbnail, playback resumes 15 seconds further from when the user was previously watching the content. In some embodiments, there might be a specific area of the screen set aside to allow the user to leave the transport mode.

Figure 6:
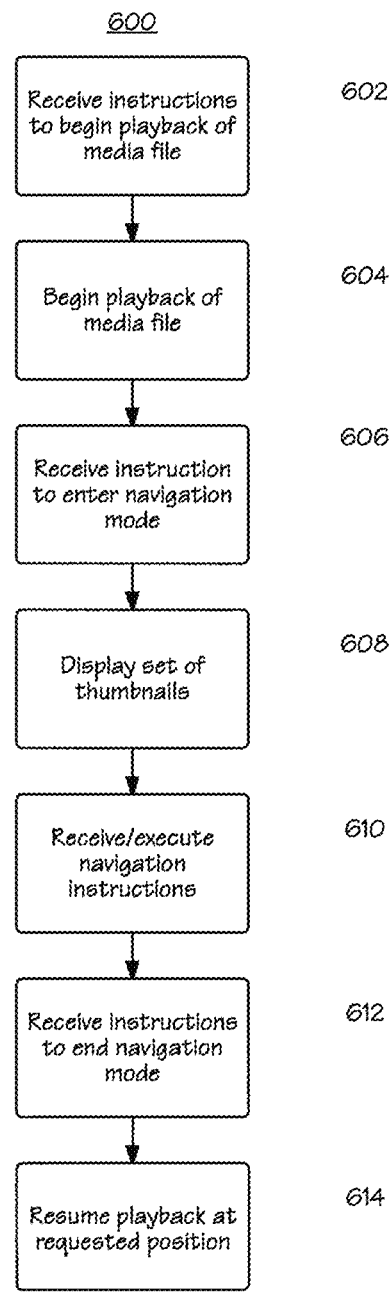
FIG. 6 is a flow chart illustrating the operation of an embodiment.

A flowchart illustrating the operation of a touchscreen media transportation method 600 is presented in FIG. 6. Method 600 is merely exemplary and is not limited to the embodiments presented herein. Method 600 can be employed in many different embodiments or examples not specifically depicted or described herein. In some embodiments, the procedures, the processes and/or the activities of method 400 can be performed in the order presented. In other embodiments, the procedures, the processes, and/or the activities of method 600 can be performed in any other suitable order. In still other embodiments, one or more of the procedures, the processes, and/or the activities of method 600 can be combined or skipped. In some embodiments, portions of method 600 can be implemented by computer system 100 (FIG. 1).

A mobile device receives instructions from a user to initiate the playback of a media file (block 602). This can be done in a variety of different manners. For example, there can be a list of available media files to play that is displayed to the user. A user selects a media file (often by tapping a thumbnail or a title of the media file). The mobile device begins playback of the media file (block 604). The mobile device receives an instruction to enter into a navigation mode (block 606). As described above, the navigation mode can be entered into in a variety of different manners. In some embodiments, the navigation mode can be initiated by a user tapping on the screen. In some embodiments, the navigation mode can be initiated by a user tapping on the screen in a specific area of the screen.

When the mobile device receives such an input, the navigation mode is activated. Once the navigation mode is activated, a set of thumbnails is displayed on the mobile device (block 608). Each thumbnail in the set of thumbnails represents a point in time of the media file. As described above, one thumbnail can be a frame that is 5 seconds further in time from the present frame, the next thumbnail can be a frame that is 10 seconds further in time from the present frame and so on. In one embodiment, each of the thumbnails in the set of thumbnails are approximately one-half the height of the main display (as illustrated as thumbnails 520 from FIG. 5). As discussed above, the thumbnails can be re-sized in a variety of different manners. As the size of the thumbnails gets smaller, more thumbnails might be displayed. As the size of the thumbnails gets larger, fewer thumbnails might be displayed.

Along with the thumbnails, time indicators (such as time indicators 530 from FIG. 5) are also shown. The manner in which the thumbnails can be displayed are varied. One of a variety of different techniques that currently exist in the art or techniques that are developed in the future can be used to display the thumbnails. In some embodiments, thumbnails are embedded in the media file being displayed. In such an embodiment, the thumbnails can be accessed and displayed using common thumbnail display techniques.

Returning to FIG. 6, inputs are received on the mobile device for navigation purposes (block 610). A variety of different inputs can be used for navigation purposes. A swipe from right to the left can be used to navigate forward in the media file. A swipe from left to the right can be used to navigate to previous times in the media file. A swipe from the bottom of the display towards the top can increase the amount of movement by the swipes. A swipe from the top of the display towards the bottom can decrease the amount of movement by the swipes. In some embodiments, the default amount of time between screenshots is one second. In some embodiments, the default amount of time between screenshots is dependent on the encoding of the media file (such that longer media files might have a longer amount of time between screenshots). The instructions received are translated into visual movement of the thumbnails.

Once the user has found the desired location that where he wants playback to resume, the user sends an input indicating a desire to end the navigation mode (block 612). In some embodiments, tapping on the screen can indicate a desire to end the navigation mode. In some embodiments, a double tap on the screen can be used as such an input. In some embodiments, there might be a specific area of the screen that a user accesses to end navigation mode. In some embodiments, there can be a physical button on the mobile device that can be accessed to end the navigation mode. In some embodiments, there can be other methods used by a user to indicate a desire to end the navigation mode.

Once an embodiment receives the indication of a desire to end the navigation mode, playback is resumed at the portion of the media file indicated by the user (block 614). This process of resuming playback at a certain time can use a variety of techniques now known or developed in the future. For example, once it is known that a user wants to view a media file starting at 50 minutes and 32 seconds, the portion of the media file starting at that point can be requested by a server. Thereafter, the portion of the media file corresponding to 50:32 is downloaded to the mobile device, and playback can be initiated. If the portion of the media file corresponding to 50:32 is already in the memory of the mobile device, that portion is retrieved from the memory, and playback is resumed as soon as the requested portion is retrieved. In addition, any visual indications of the current position in the file are updated. For example, if there is text indicating the minute and second of the media file being played, that text is updated, as well. If there is a visual indication of position such as an indicator and/or slider, that indication is updated with the new position, too.

Figure 7:
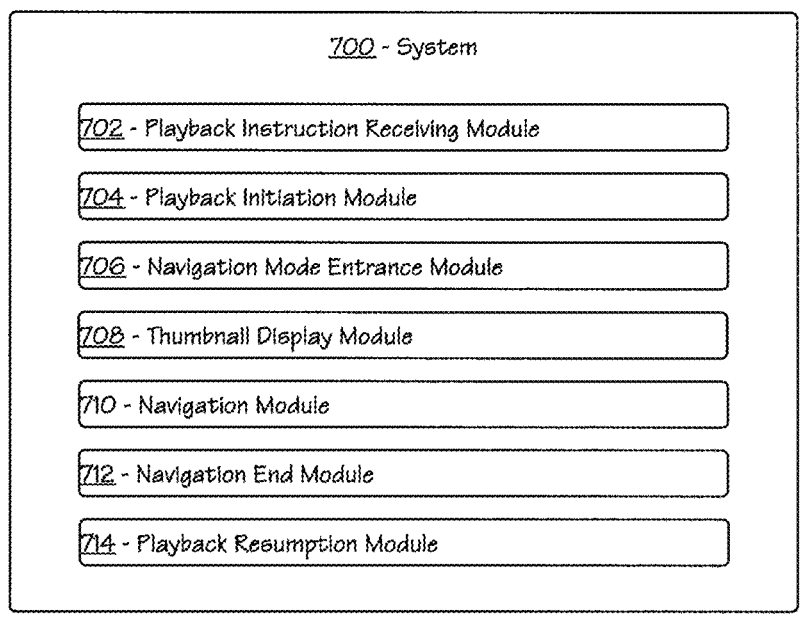
FIG. 7 is a block diagram illustrating a system capable of performing an embodiment.

Turning ahead in the figures, FIG. 7 illustrates a block diagram of a system 700 that is capable of performing disclosed embodiments. System 700 is merely exemplary and is not limited to the embodiments presented herein. System 700 can be employed in many different embodiments or examples not specifically depicted or described herein. In some embodiments, certain elements or modules of system 700 can perform various procedures, processes, and/or acts. In other embodiments, the procedures, processes, and/or acts can be performed by other suitable elements or modules.

In a number of embodiments, system 700 can include playback instruction receiving module 702. In certain embodiments, playback instruction receiving module 702 can perform block 602 (FIG. 6) of receiving instructions to initiate playback of a media file.

In a number of embodiments, system 700 can include playback initiation module 704. In certain embodiments, playback initiation module 704 can perform block 604 (FIG. 6) of initiating playback of a media file.

System 700 can include navigation mode entrance module 706. In certain embodiments, navigation mode entrance module 706 can perform block 606 (FIG. 6) of receiving instructions to enter a navigation mode.

System 700 can include thumbnail display module 708. In certain embodiments, thumbnail display module 708 can perform block 608 (FIG. 6) of displaying thumbnails on the mobile device.

System 700 can include navigation module 710. In certain embodiments, navigation module 710 can perform block 610 (FIG. 6) of receiving navigation inputs from the user.

System 700 can include navigation end module 712. In certain embodiments, navigation end module 712 can perform block 612 (FIG. 6) of receiving an input indicating a desire to end navigation mode.

System 700 can include playback resumption module 714. In certain embodiments, playback resumption module 714 can perform block 614 (FIG. 6) of resuming playback.

Figure 8:
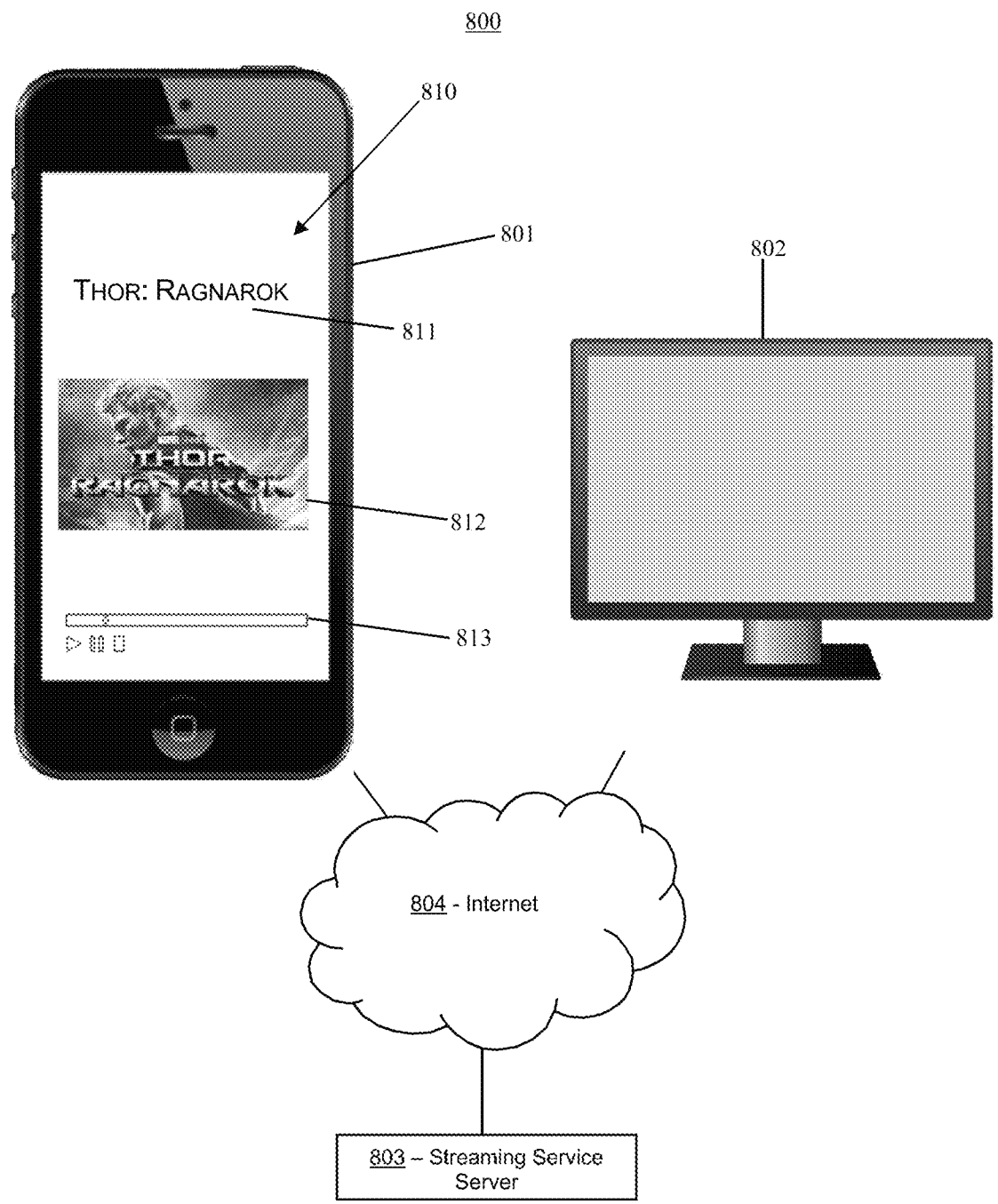
FIG. 8 illustrates a representative diagram of a system, according an embodiment.

Turning now to FIG. 8, an exemplary embodiment of a system 800 executing an exemplary embodiment of a method for scrolling through media files. In some embodiments, a touchscreen device 801 is used to initiate and control playback of a media file that is displayed on an electronic device 802 that is different and separate from the electronic device. In the same or different embodiments, the electronic device and the touchscreen device are the same device.

In various embodiments, system 800 can display interfaces displayed in screenshots 400 (FIGS. 4A and 4B) and/or 500 (FIG. 5) on touchscreen device 801 and/or electronic device 802. In the same or different embodiments, different interfaces can be displayed on system 800, such as interface 810. In some embodiments, interface 810 can comprise a title of a media file 811, a media file banner 812, and/or a track bar 813 when not in navigation mode. In some embodiments, when navigation mode is entered, a title of a media file 811, a media file banner 812, and/or a track bar 813 can fade, disappear, and/or shrink such that they do not overlap or disrupt interfaces displayed in screenshots 400 (FIGS. 4A and 4B) and/or 500 (FIG. 5).

In various embodiments, a touchscreen device 801 can display interface 810 and/or interfaces displayed in screenshots 400 (FIGS. 4A and 4B) and/or 500 (FIG. 5) while a media file is played on an electronic device 802. In the same or different embodiments, both touchscreen device 801 and electronic device 802 can display the interfaces displayed in screenshots 400 (FIGS. 4A and 4B) and 500 (FIG. 5).

In some embodiments, touchscreen device 801 and electronic device 802 are not in direct communication with each other. For example, a streaming service server 803 can act as an intermediary between touchscreen device 801 and electronic device 802 using Internet 804, some other suitable network, or through direct communication. In the same or different embodiments, streaming service server 803 hosts a set of thumbnails derived from a media file, and can transmit thumbnails to a device displaying interface 810 and/or interfaces displayed in screenshots 400 (FIGS. 4A and 4B) and/or 500 (FIG. 5). In further embodiments, streaming service server 803 can be in communication with a dongle (not shown) using Internet 804, some other suitable network, or through direct communication. In the same or different embodiments, the dongle (not shown) can be coupled to electronic device 802 to facilitate touchscreen device 801 being used to initiate and control playback of a media file that is displayed on electronic device 802. In various embodiments, a dongle (not shown) can receive communications from the streaming service server 803 comprising commands sent from touchscreen device 801, a media file streamed from the streaming service server 803, and/or a set of thumbnails derived from a media file. In some embodiments, the dongle (not shown) can transmit instructions to display a media file, a set of thumbnails derived from a media file, an interface shown in screenshot in screenshots 400 (FIGS. 4A and 4B) and/or 500 (FIG. 5), or interface 800 on electronic device 802. In the same or different embodiments, streaming service server 803 can simultaneously transmit a media file to electronic device 802 and a set of thumbnails derived from a media file to a touchscreen device 801. In some embodiments, streaming service server 803 can simultaneously transmit a media file to a touchscreen device and a set of thumbnails derived from a media file to a dongle coupled to electronic device 802.

In some embodiments, the methods performed by the various disclosed systems can comprise receiving various types touchscreen inputs, thus allowing for multiple different commands to be received by the systems. In some embodiments, the systems can receive a single point touchscreen input. In the same or different embodiments, the systems can receive a multi-point touchscreen input. For example, the multi-point touchscreen input can comprise a 2 point touchscreen input, a 3 point touchscreen input, a 4 point touchscreen input, a 5 point touchscreen input, a 6 point touchscreen input, a 7 point touchscreen input, an 8 point touchscreen input, a 9 point touchscreen input, and/or a 10 point touchscreen input. In various embodiments, a touchscreen input can comprise a tap and/or a swipe.

In some embodiments, communications and/or data transmitted and/or received by, within and/or between system 800 can be performed automatically. In further embodiments, communications and/or data transmitted and/or received by, within and/or between system 800 can be performed in real time. In other embodiments, from communications and/or data transmitted and/or received by, within and/or between system 800 can originate from multiple sources.

In some embodiments, touchscreen inputs comprising a single point swipe and/or tap can be used by systems 300 (FIG. 3) 800 to enter a navigation mode. In the same or different embodiments, a multi-point swipe and/or tap can be used by systems 300 (FIG. 3) 800 to enter a navigation mode. In various embodiments, a swipe and/or tap near the center of a touchscreen can be used to enter the navigation mode. In various embodiments, a swipe and/or tap near the left side, right side, top, bottom, upper right corner, upper left corner, lower right corner, or lower left corner of a touchscreen can be used to enter the navigation mode. In this way, a user can enter navigation mode when he is using the touchscreen device with different hands and/or in different orientations.

In some embodiments, touchscreen inputs comprising a swipe and/or tap can be used by systems 300 (FIG. 3) 800 to navigate through a media file. In the same or different embodiments, a multi-point swipe and/or tap can be used by systems 300 (FIG. 3) 800 to navigate through a media file. In the same or different embodiments, a swipe can be used to move forward and/or backward depending on the directionality of the swipe. For example, a left-to right, right-to-left, top-to-bottom, or bottom-to-top swipe can move a media file forward and/or backward in time. In this way, a user can navigate through a media file when he is using the touchscreen device with different hands and/or in different orientations.

In some embodiments, a length of a single point and/or multi-point swipe can be proportional to an amount of time that a media file is advanced and/or rewound. In the same or different embodiments, the relationship between a length of a swipe and an amount of time that a media file is advanced and/or rewound can be a linear relationship such that each unit of distance traveled by a swipe increases an amount of time that a media file is advanced and/or rewound by an equal amount of time. In further embodiments, the relationship between a length of a swipe and an amount of time that a media file is advanced and/or rewound can be an exponential relationship such that each unit of distance traveled by a swipe increases an amount of time that a media file is advanced and/or rewound by an increasing amount of time.

In some embodiments, a single point and/or multi-point swipe that advances and/or rewinds a media file can comprise a first distance and/or a second distance. In the same or different embodiments, a single point and/or multi-point swipe that travels a first distance will advance a media file at a rate of approximately 1×, 2×, 3×, 4×, 5×, 6×, 7×, 8×, 9×, and/or 10×. In further embodiments, a single point and/or multi-point swipe that advances and/or rewinds a media file can comprise a second distance that is greater than a predetermined distance and/or greater than the first distance. For example, a single point and/or multi-point swipe that travels a second distance will advance and/or rewind a media file at a rate of approximately 1×, 2×, 3×, 4×, 5×, 6×, 7×, 8×, 9×, and/or 10× greater than the single point and/or multi-point swipe that travels the first distance. As another non-limiting example, a swipe can advance and/or rewind a media file one second for every 10 pixels of distance traveled across the touchscreen, a predetermined distance can be 150 pixels, and a media file can be advanced and/or rewound 5 seconds for every 10 pixels traveled beyond the predetermined distance. The aforementioned non-limiting example corresponds with an embodiment where a first distance advances and/or rewinds a media file at a rate of 1× and a second distance advances and/or rewinds a media file at a rate of 5×.

In some embodiments, touchscreen inputs comprising a swipe and/or a tap can be used by systems 300 (FIG. 3) and 800 to adjust a volume of a media file played on an electronic device. In the same or different embodiments, a multi-point swipe and/or a tap can be used by systems 300 (FIG. 3) and 800 to adjust a volume of a media file played on an electronic device. In the same or different embodiments, a swipe can be used to increase and/or decrease a volume of a media file played on an electronic device depending on the directionality of the swipe. In various embodiments, a left-to right, right-to-left, top-to-bottom, or bottom-to-top swipe can increase and/or decrease a volume of a media file played on an electronic device. In this way, a user can adjust the volume of a media file being played on an electronic device when he is using the touchscreen device with different hands and/or in different orientations.

In some embodiments, a length of a single point and/or multi-point swipe can be proportional to an amount a volume of a media file being played on an electronic device can be increase and/or decreased. In the same or different embodiments, the relationship between a length of a swipe and an amount a volume of a media file being played on an electronic device is increase and/or decreased can be a linear relationship such that each unit of distance traveled by a swipe increases and/or decreases a volume of a media file on an electronic device an equal percentage of the maximum volume. In further embodiments, the relationship between a length of a swipe and an amount a volume of a media file being played on an electronic device is increase and/or decreased can be an exponential relationship such that each unit of distance traveled by a swipe increases and/or decreases a volume of a media file on an electronic device by an increasing percentage of the maximum volume.

In some embodiments, a single point and/or multi-point swipe that adjusts a volume of a media file being played on an electronic device can comprise a first distance and/or a second distance. In the same or different embodiments, a single point and/or multi-point swipe that travels a first distance will increase and/or decrease a volume of a media file being played on an electronic device at a rate of approximately 1×, 2×, 3×, 4×, 5×, 6×, 7×, 8×, 9×, and/or 10×. In further embodiments, a single point and/or multi-point swipe that that adjusts a volume of a media file being played on an electronic device can comprise a second distance that is greater than a predetermined distance and/or greater than a first distance. For example, a single point and/or multi-point swipe that travels a second distance will increase and/or decrease a volume of a media file being played on an electronic device at a rate of approximately 1× 2×, 3×, 4×, 5×, 6×, 7×, 8×, 9×, and/or 10× greater than the single point and/or multi-point swipe that travels the first distance. As another non-limiting example, a swipe can increase and/or decrease a volume of a media file being played on an electronic device one percentage of the maximum volume for every 10 pixels of distance traveled across the touchscreen, a predetermined distance can be 150 pixels, and a volume of a media file being played on an electronic device can be increased and/or decreased five percent of the maximum volume for every 10 pixels traveled beyond the predetermined distance. The aforementioned non-limiting example corresponds with an embodiment where a first distance increases and/or decreases a volume of a media file being played on an electronic device at a rate of 1× and a second distance increases and/or decreases a volume of a media file being played on an electronic device at a rate of 5×.

In some embodiments, touchscreen inputs comprising a swipe and/or a tap can be used by systems 300 (FIG. 3) 800 to adjust a brightness of a media file played on an electronic device. In the same or different embodiments, a multi-point swipe and/or a tap can be used by systems 300 (FIG. 3) 800 to adjust a brightness of a media file played on an electronic device. In various embodiments, once a media file is completed, a brightness of an electronic device will return to a brightness an electronic device was at before the media file began. In the same or different embodiments, a swipe can be used to increase and/or decrease a brightness of a media file played on an electronic device depending on the directionality of the swipe. In various embodiments, a left-to right, right-to-left, top-to-bottom, or bottom-to-top swipe can increase and/or decrease a brightness of a media file played on an electronic device. In this way, a user can adjust the brightness of a media file being played on an electronic device when he is using the touchscreen device with different hands and/or in different orientations.

In some embodiments, a length of a single point and/or multi-point swipe can be proportional to an amount a brightness of a media file being played on an electronic device can be increase and/or decreased. In the same or different embodiments, the relationship between a length of a swipe and an amount a brightness of a media file being played on an electronic device is increase and/or decreased can be a linear relationship such that each unit of distance traveled by a swipe increases and/or decreases a brightness of a media file on an electronic device an equal percentage of the maximum brightness. In further embodiments, the relationship between a length of a swipe and an amount a brightness of a media file being played on an electronic device is increase and/or decreased can be an exponential relationship such that each unit of distance traveled by a swipe increases and/or decreases a brightness of a media file on an electronic device by an increasing percentage of the maximum brightness.

In some embodiments, a single point and/or multi-point swipe that adjusts a brightness of a media file being played on an electronic device can comprise a first distance and/or a second distance. In the same or different embodiments, a single point and/or multi-point swipe that travels a first distance will increase and/or decrease a brightness of a media file being played on an electronic device at a rate of approximately 1× 2×, 3×, 4×, 5×, 6×, 7×, 8×, 9×, and/or 10×. In further embodiments, a single point and/or multi-point swipe that that adjusts a brightness of a media file being played on an electronic device can comprise a second distance that is greater than a predetermined distance and/or greater than the first distance. For example, a single point and/or multi-point swipe that travels a second distance will increase and/or decrease a brightness of a media file being played on an electronic device at a rate of approximately 1× 2×, 3×, 4×, 5×, 6×, 7×, 8×, 9×, and/or 10× greater than the single point and/or multi-point swipe that travels the first distance. As another non-limiting example, a swipe can increase and/or decrease a brightness of a media file being played on an electronic device one percentage of the maximum brightness for every 10 pixels of distance traveled across the touchscreen, a predetermined distance can be 150 pixels, and a brightness of a media file being played on an electronic device can be increased and/or decreased five percent of the maximum brightness for every 10 pixels traveled beyond the predetermined distance. The aforementioned non-limiting example corresponds with an embodiment where a first distance increases and/or decreases a brightness of a media file being played on an electronic device at a rate of 1× and a second distance increases and/or decreases a brightness of a media file being played on an electronic device at a rate of 5×.

The above embodiments have been described with reference to media file playback on a touchscreen device. It will be understood by those skilled in the art that various changes can be made without departing from the spirit or scope of the disclosure. For example, the media file can include audio only, video only, or a combination of audio and video. In addition, embodiments can be performed on devices that do not have a touchscreen interface. For example, a mouse, trackpad, touchpad, trackball, remote control, or various other interface devices also be used.

Although the above embodiments have been described with reference to specific embodiments, it will be understood by those skilled in the art that various changes can be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-7 can be modified, and that the foregoing discussion of certain of these embodiments does not necessarily represent a complete description of all possible embodiments. For example, one or more of the procedures, processes, or activities of FIGS. 1-7 can include different procedures, processes, and/or activities and be performed by many different modules, in many different orders.

Replacement of one or more claimed elements constitutes reconstruction and not repair. Additionally, benefits, other advantages, and solutions to problems have been described with regard to specific embodiments. The benefits, advantages, solutions to problems, and any element or elements that can cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable media storing computing instructions configured to run on the one or more processors and perform:
   transmitting instructions to initiate a playback of a media file on an electronic device;
   receiving, from a user, an instruction to enter a navigation mode;
   in response to receiving the instruction to enter the navigation mode;
   receiving a navigational input comprising a movement; and
   transmitting instructions to simultaneously display two or more thumbnails of a set of multiple thumbnails on a display, wherein each respective thumbnail of the set of multiple thumbnails represents a different portion of the media file that is spaced a common time (T) from other neighboring different portions of the media file represented by one of the set of multiple thumbnails, wherein the common time (T) comprises a first value when a length of the movement is at or below a first distance and comprises a second value greater than the first value when the length of the movement is greater than the first distance;
   receiving, from the user, an input indicating a request to view a first portion of the media file represented by a first thumbnail of the two or more thumbnails; and
   transmitting instructions to resume the playback of the media file on the electronic device at the first portion of the media file represented by the first thumbnail of the two or more thumbnails.

2. The system of claim 1, wherein:
   the instruction to enter the navigation mode is sent from a mobile electronic device of the user comprising a touchscreen, the mobile electronic device being different than the electronic device; and
   the input indicating the request to view the first portion of the media file comprises a touchscreen input.

3. The system of claim 2, wherein:
   the touchscreen input comprises a single point left-to-right swipe on a touchscreen; and
   the first portion of the media file comprises a portion of the media file comprising a time forward in the media file.

4. The system of claim 3, wherein a length of the single point left-to-right swipe is proportional to the time forward in the media file of the first portion of the media file.

5. The system of claim 3, wherein:
   when a length of the single point left-to-right swipe comprises a first distance, each thumbnail of the set of multiple thumbnails is advanced to the first thumbnail of the set of multiple thumbnails at a first rate for each unit of distance the single point left-to-right swipe travels.

6. The system of claim 5, wherein:
   when the length of the single point left-to-right swipe comprises a second distance beyond the first distance, each thumbnail of the set of multiple thumbnails is advanced to the first thumbnail of the set of multiple thumbnails at a second rate faster than the first rate for each unit of distance the swipe travels.

7. The system of claim 2, wherein:
   the touchscreen input comprises a single point right-to-left swipe on the touchscreen; and
   the first portion of the media file comprises a portion of the media file comprising a time backward in the media file.

8. The system of claim 7, wherein a length of the single point right-to-left swipe is proportional to the time backward in the media file of the first portion of the media file.

9. The system of claim 1, wherein the computing instructions are further configured to perform:
   receiving a second input from the user, the second input comprising a single point bottom-to-top swipe on a touchscreen; and
   after receiving the second input, transmitting instructions to increase a volume of the media file on the electronic device.

10. The system of claim 1, wherein the computing instructions are further configured to perform:
    receiving a second input from the user, the second input comprising a multi-point bottom-to-top swipe on a touchscreen; and after receiving the second input, transmitting instructions to increase a brightness of the media file on the electronic device.

11. A method implemented via execution of computing instructions configured to run at one or more processors and configured to be stored at non-transitory computer-readable media, the method comprising:
transmitting instructions to initiate a playback of a media file on an electronic device;
receiving, from a user, an instruction to enter a navigation mode;
in response to receiving the instruction to enter the navigation mode;
receiving a navigational input comprising a movement; and
transmitting instructions to simultaneously display two or more thumbnails of a set of multiple thumbnails on a display, wherein each respective thumbnail of the set of multiple thumbnails represents a different portion of the media file that is spaced a common time (T) from other neighboring different portions of the media file represented by one of the set of multiple thumbnails, wherein the common time (T) comprises a first value when a length of the movement is at or below a first distance and comprises a second value greater than the first value when the length of the movement is greater than the first distance;
receiving, from the user, an input indicating a request to view a first portion of the media file represented by a first thumbnail of the two or more thumbnails; and
transmitting instructions to resume the playback of the media file on the electronic device at the first portion of the media file represented by the first thumbnail of the two or more thumbnails.

12. The method of claim 11, wherein:
the instruction to enter the navigation mode is sent from a mobile electronic device of the user comprising a touchscreen, the mobile electronic device being different than the electronic device; and
the input indicating the request to view the first portion of the media file comprises a touchscreen input.

13. The method of claim 12, wherein:
the touchscreen input comprises a single point left-to-right swipe on a touchscreen; and
the first portion of the media file comprises a portion of the media file comprising a time forward in the media file.

14. The method of claim 13, wherein a length of the single point left-to-right swipe is proportional to the time forward in the media file of the first portion of the media file.

15. The method of claim 13, wherein:
when a length of the single point left-to-right swipe comprises a first distance, each thumbnail of the set of multiple thumbnails is advanced to the first thumbnail of the set of multiple thumbnails at a first rate of for each unit of distance the single point left-to-right swipe travels.

16. The method of claim 15, wherein:
when the length of the single point left-to-right swipe comprises a second distance beyond the first distance, each thumbnail of the set of multiple thumbnails is advanced to the first thumbnail of the set of multiple thumbnails at a second rate faster than the first rate of for each unit of distance the swipe travels.

17. The method of claim 12, wherein:
the touchscreen input comprises a single point right-to-left swipe on the touchscreen; and
the first portion of the media file comprises a portion of the media file comprises a time backward in the media file.

18. The method of claim 17, wherein a length of the single point right-to-left swipe is proportional to the time backward in the media file of the first portion of the media file.

19. The method of claim 11 further comprising:
receiving a second input from the user, the second input comprising a single point bottom-to-top swipe on a touchscreen; and
after receiving the second input, automatically and in real time transmitting instructions to increase a volume of the media file on the electronic device.

20. The method of claim 11 further comprising
receiving a second input from the user, the second input comprising a multi-point bottom-to-top swipe on a touchscreen; and
after receiving the second input, transmitting instructions to increase a brightness of the media file on the electronic device.

* * * * *